United States Patent [19]
Doi et al.

[11] Patent Number: 4,484,799
[45] Date of Patent: Nov. 27, 1984

[54] WIDE ANGLE ZOOM LENS

[75] Inventors: Yoshikazu Doi; Yutaka Sakai; Kazunori Ohno, all of Omiya, Japan

[73] Assignee: Fuji Photo Optical Co., Ltd., Saitenma, Japan

[21] Appl. No.: 330,781

[22] Filed: Dec. 14, 1981

Related U.S. Application Data

[63] Continuation-in-part of Ser. No. 71,048, Aug. 30, 1979, abandoned.

[30] Foreign Application Priority Data

Sep. 1, 1978 [JP] Japan ................. 53-107737

[51] Int. Cl.³ .................. G02B 13/04; G02B 15/14
[52] U.S. Cl. ................................... 350/426
[58] Field of Search ............................ 350/426

[56] References Cited

U.S. PATENT DOCUMENTS 4,142,779 3/1979 Ogawa ................. 350/426
4,157,212 6/1979 Ogawa ................. 350/426

Primary Examiner—John K. Corbin
Assistant Examiner—Scott J. Sugarman
Attorney, Agent, or Firm—Lucas & Just

[57] ABSTRACT

A compact wide angle zoom lens comprising front and rear lens groups which are moved in opposite directions along the optical axis of the lens system to vary the magnification. The front lens group comprises a concave meniscus lens, a concave lens and a concave lens and the rear lens group comprises a convex lens, a first convex meniscus lens, a concave lens and two convex meniscus lenses, in the order mentioned from the object side.

2 Claims, 28 Drawing Figures

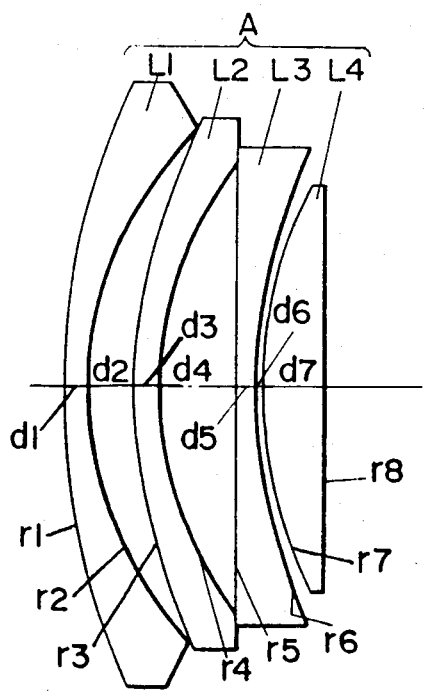
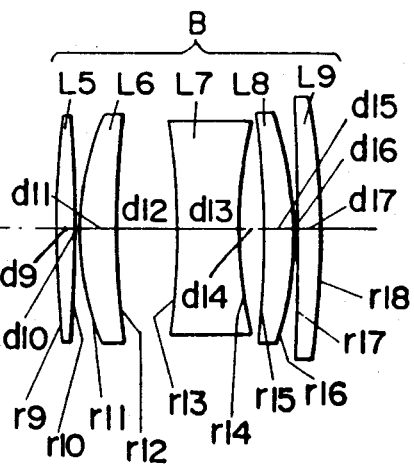
FIG. 1
FIG. 2A  FIG. 2B  FIG. 2C
FIG. 3A  FIG. 3B  FIG. 3C

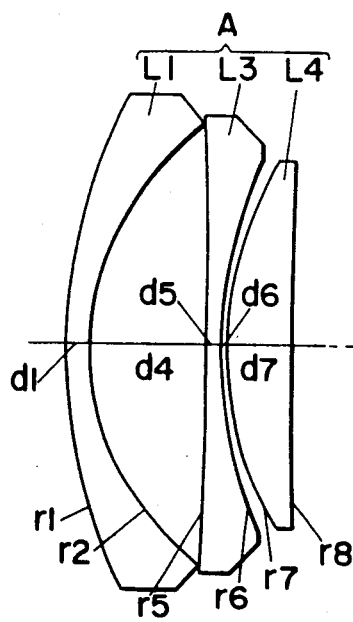
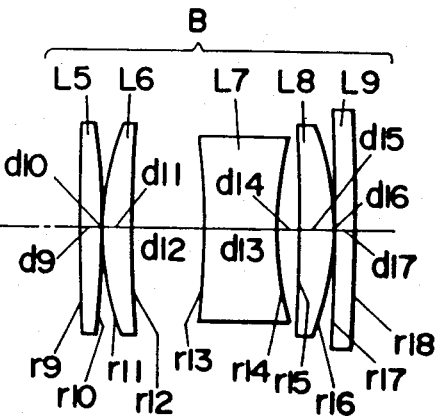

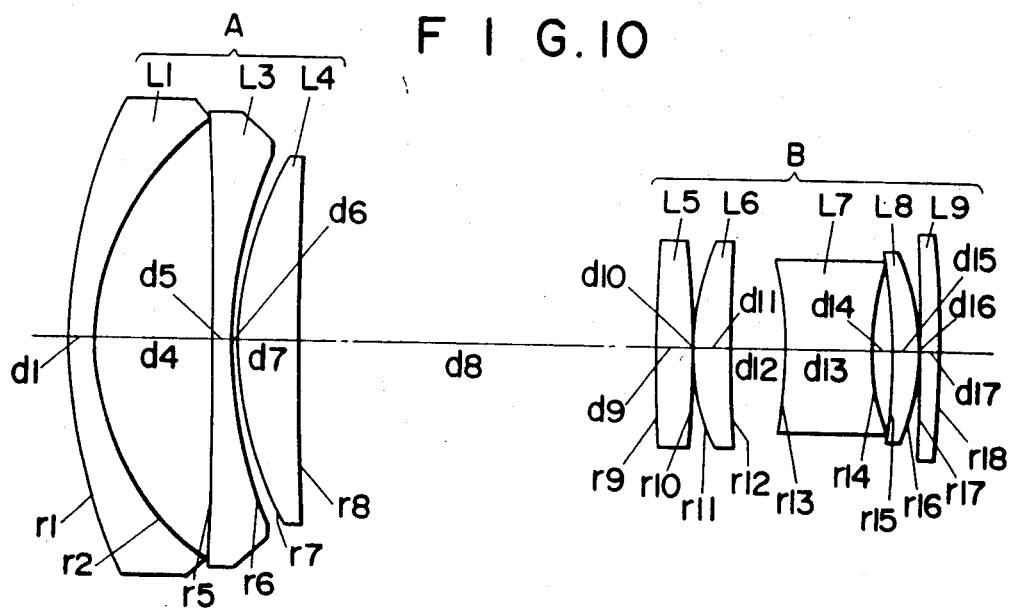

WIDE ANGLE ZOOM LENS

This is a continuation-in-part of application Ser. No. 071,048, filed Aug. 30, 1979, now abandoned.

BACKGROUND OF THE INVENTION

1. Field of the Invention

This invention relates to a zoom lens, and more particularly to a wide angle zoom lens wherein the zoom ratio is 1.54 and the range of zoom movement of the lens begins at a wide angle embracing an image angle approximating 73° on the wide angle side.

2. Description of the Prior Art

Single lens reflex cameras are becoming increasingly compact and, as a result, the lenses for these cameras are required to be proportionately decreased in size. Thus, there has arisen the necessity for developing a zoom lens which has a simple lens structure, permits use of a small lens barrel and enjoys the advantages of low cost and ease of handling.

SUMMARY OF THE INVENTION

In order to meet this necessity, the present invention aims to provide compact zoom lens, particularly a zoom lens of the type suitable for use in a still camera, which is adapted to permit the magnification to be varied in the reange from the wide angle side of short focal length up to the standard zone and which is capable of providing the desired performance.

BRIEF DESCRIPTION OF THE DRAWING

FIG. 1 is a diagrammatic view showing the lens structure of one preferred embodiment of the wide angle zoom lens according to this invention, FIGS. 2A-2C and 3A-3C are graphic views showing the spherical aberration, sine condition, astigmatism and distortion on the wide angle side (2A-2C) and those on the telephoto side (3A-3C) in the preferred embodiment mentioned above, FIG. 7 is a diagrammatic view showing the lens structure of yet another preferred embodiment of the wide angle zoom lens according to the invention, FIGS. 8A-8C and 9A-9C are graphic views showing the spherical aberration, sine condition, astigmatism and distortion on the wide angle side (8A-8C) and those on the telephoto side (9A-9C) in the preferred embodiment shown in FIG. 7, FIG. 10 is a diagrammatic view showing the lens structure of still another preferred embodiment of the wide angle zoom lens according to this invention, and FIGS. 11A-11C and 12A-12C are graphic views showing the spherical aberration, sine condition, astigmatism and distortion on the wide angle side (11A-11C) and those on the telephoto side (12A-12C) respectively in the preferred embodiment shown in FIG. 10.

PREFERRED EMBODIMENTS OF THE INVENTION

Figure 4:
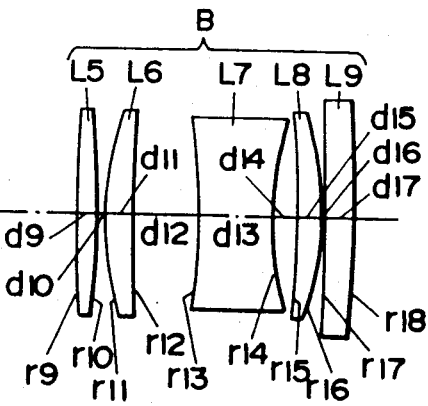
FIG. 4 is a diagrammatic view showing the lens structure of another preferred embodiment of the wide angle zoom lens according to this invention.
Figure 5A:
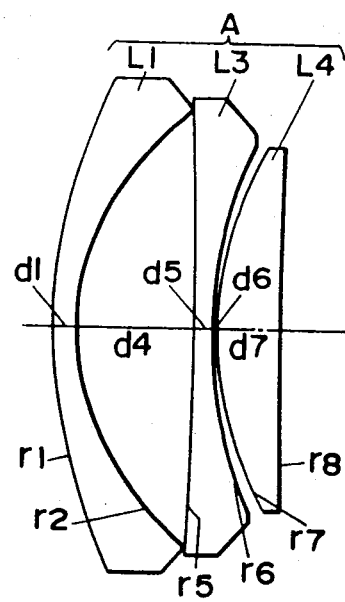
FIGS. 5A-5C and 6A-6C are graphic views showing the spherical aberration, sine condition, astigmatism and distortion on the wide angle side (5A-5C) and those on the telephoto side (6A-6C) in the preferred embodiment shown in FIG. 4.
Figure 5A:
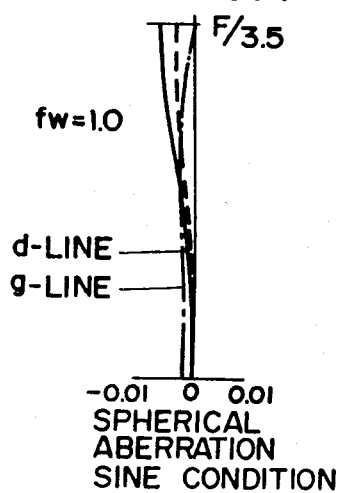
Figure 5B:
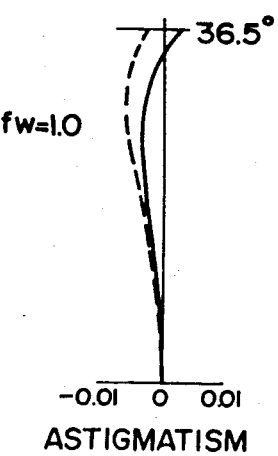
Figure 5C:
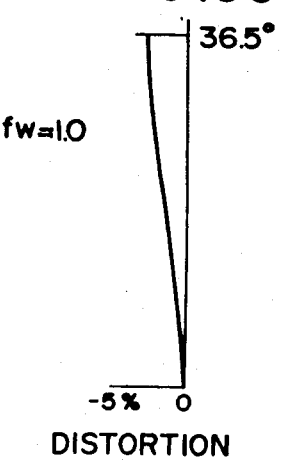
Figure 6A:
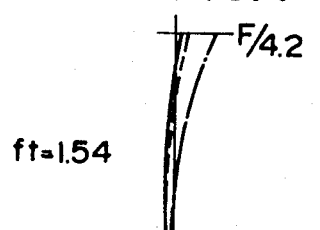
Figure 6B:
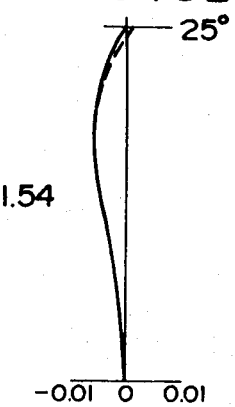
Figure 6C:
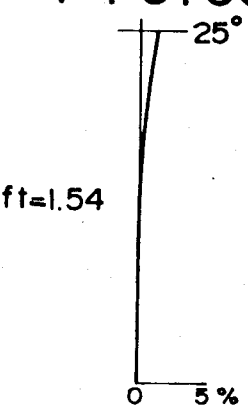

Specifically, this invention provides a wide angle zoom lens consisting of a front lens group A comprising at least one negative meniscus lens L1 having its convex surface directed toward the object side, one negative meniscus or biconcave lens L3 having the surface of larger radius of curvature directed toward the object side and a positive meniscus lens L4 having the surface of larger radius of curvature directed toward the image side and a rear lens group B comprising one biconvex lens L5, positive meniscus lens L6 having its convex surface directed toward the object side, one biconcave lens L7 having the surface of larger radius of curvature directed toward the object and two positive meniscus lenses L8 and L9 with the convex side toward the image in the order mentioned from the object side and adapted to provide variation in magnification by causing the two lens groups mentioned above to be moved in mutually opposite directions along the optical axis of the lens system, which zoom lens is characterized by fulfilling the following requirements in which the focal length (fW) on the wide angle side is assumed to be 1:

(1) $-2.1 < fA < -1.7$
(2) $0.2 < d12 + d13 < 0.45$
(3) $-0.1 < 1/r5 < 0.1$
(4) $0.9 < 1/r7 < 1.3$
(5) $1.2 < 1/r11 < 1.6$
(6) $-0.8 < 1/r13 < -0.5$
(7) $vd4 < 30.0$ wherein, fA stands for the focal length of the front lens group A, r5 for the radius of curvature of the objective side of the lens L3, r7 for the radius of curvature of the object side of the lens L5, r11 for the radius of curvature of the object side of the convex meniscus lens L6, r13 for the radius of curvature of the object side of the concave lens L7, d12 for the length of the air gap between the concave lens L6 and the concave lens L7, d13 for the center thickness of the lens L7 and $vd4$ for the Abbe number of the lens L4.

The requirement (1) is necessary for the purpose of obtaining the required reduction in size of the zoom lens system. If the focal length fA of the front zoom lens group A is greater than −2.1 in absolute value, the amount of the zoom movement of the front lens group A must be increased to maintain the zoom ratio constant and the lens diameter must be also increased to admit sufficient marginal light on the wide angle side, with the result that the aim of decreasing the size of the zoom lens system is defeated. Although a focal length fA smaller than −1.7 in absolute value would appear advantageous from the point of decreasing the size of the lens system, it is actually detrimental because the amount of the zoom movement of the rear lens group B must be increased and the back focus must be consequently lengthened excessively on the telephoto side in order to maintain the zoom ratio and the rear lens group must consequently be enlarged in order to prevent the F number from decreasing.

An attempt to reduce the amount of the zoom movement of the rear lens group by shortening the focal length of the rear lens group B adversely affects spherical aberration, curvature of field, distortion, etc. This is why the requirement (1) must be fulfilled.

The requirement (2) is also necessary for obtaining the required decrease in size of the lens system. If the sum d12=d13 is smaller than 0.2, the back focus of the entire lens system is lengthened by a factor which is greater than the amount by which this sum is smaller than 0.2 and this makes it difficult to decrease the size of the lens system. An attempt to shorten the back focus by increasing the focal length of the lens L7 gives rise to a problem that the spherical aberration and curvature of field produced by the lenses L5 and L6 are insufficiently corrected. If the sum d12+d13 is greater than 0.45, the back focus on the wide angle side becomes too short for the lens system to be used on a single lens reflex camera. An attempt to lengthen the back focus by increasing the length of the air gap d14 between the lens L7 and the lens L8 entails a problem that the comatic aberration and the off-axis chromatic aberration are aggravated. For the required decrease in size of the lens system, therefore, the requirement (2) is as important as the requirement (1).

The requirements (3) through (7) are necessary to assure that the zoom lens system decreased in size in accordance with the requirements (1) and (2) has good optical properties. The requirement (3) defines the radius of curvature r5 of the object side of the lens L3 for the purpose of reducing variation in the spherical aberration and curvature of field in the lenses L1 and L2 between the wide angle side telephoto side. If the value, 1/r5, falls short of the lower limit of the specified range, there ensures a problem that spherical aberration on the wide angle side is corrected less than that on the telephoto side and the curvature of field on the telephoto side is overcorrected. Conversely, if the value exceeds the upper limit of the range, there is entailed a disadvantage that the curvature of field on the wide angle side is insufficiently corrected and the comatic aberration increases.

The requirement (4) is necessary because, in the present invention, L4 is the only positive meniscus lens present in the front lens group and, therefore, this lens L4 alone must be relied on for the correction of the excessively corrected spherical aberration and curvature of field which occur in the lens group located more closely to the object side than the lens L4. This requirement (4) defines the radius of curvature r7 of the object side surface of the lens L4 for this purpose. If the value 1/r7 is greater than the upper limit of the specified range, the spherical aberration and curvature of field suffer from insufficient correction. If the value is smaller than the lower limit of the range, the spherical aberration and curvature of field are corrected excessively. Thus, a value of 1/r7 outside the specified range is disadvantageous. An attempt to make the correction on the rear surface of the lens L3 gives rise to a disadvantage in that the amount of variation in the spherical aberration is small compared with that in the curvature of field so that either the spherical aberration or the curvature of field remains insufficiently corrected. Thus, this requirement (4) must be fulfilled.

The requirement (5) is necessary because the lens L7 in the rear lens group possesses high negative refracting power and the curvature of field occuring in this lens is corrected by front surface of the positive menicus lens L6. This requirement (5) defines the radius of curvature r11 of the object side surface of the lens L6 for the purpose of this correction. If the value 1/r11 is smaller than the lower limit of the specified range, the curvature of field is excessively corrected over the entire range. An attempt to mend this excessive correction by reducing the radius of curvature of the image side surface of the lens L6 results in a problem that the spherical aberration remains insufficiently corrected and the comatic aberration in the biconcave lens L7 is aggravated. If the value 1/r11 is greater than the upper limit of the range, there is entailed a problem that the curvature of field remains insufficiently corrected.

All considered, it is concluded that the requirement (5) must be fulfilled for the entire lens system to retain the curvature of field within acceptable limits.

The requirement (6) is necessary because the insufficient correction given the spherical aberrations occuring in the front lenses L5 and L6 of the rear lens group must be compensated for by the front surface of the concave lens L7. This requirement (6), therefore, defines the radius of curvature r13 of the object side surface for the purpose of the correction. If the value 1/r13 is greater than the upper limit of the specified range, the spherical aberration remains insufficiently corrected. An attempt to cope with this trouble at the rear surface of the lens L7 leads to a disadvantage that the comatic aberration and curvature of field are aggravated. If the value 1/r13 is smaller than the lower limit, the spherical aberration suffers from excessive correction. An attempt to overcome this trouble at the lenses L8 and L9, aggravates the comatic aberration, curvature of field, chromatic aberration, etc. to a point where the lens system fails to produce an image of good quality. Thus, the requirement (6) must be fulfilled.

The requirement (7) has a bearing on the chromatic aberration. The chromatic aberration in the front lens group can be reduced by keeping the Abbe number of the lens L4 in the front lens group below the level of 30.0. Then, the chromatic aberration can be reduced from the entire lens system by making the rear lens group achromatic. If the Abbe number is greater than 30.0, the Abbe number of the lens L3 must be increased for making the front lens group achromatic. This necessitates use of a glass material possessing a low refractive index. The consequence is that the various aberrations are impaired to a point where the quality of the lens cannot be maintained at the desired level unless a complicated lens structure is used in the front lens group.

Working examples which satisfy the requirements described above will be cited below with reference to the accompanying drawing.

In the following tables, fW=the focal length and lW=the back focal length of the lens system in the wide angle side and fT=the focal length and lT=the back focal length of the lens system on the telephoto side of the zoom range.

EXAMPLE 1

FIG. 1 shows one preferred embodiment of the lens system according to the present invention. The optical data of this lens system are shown in Table 1.

TABLE 1

| R (radius of curvature) | d (distance) | Nd (refractive index) | vd (Abbe number) |
|---|---|---|---|
| r1 = 1.658892 | d1 = 0.047288 | 1. | |
| r2 = 0.804543 | d2 = 0.113491 | 1.72342 | 38.0 |
| r3 = 1.275310 | d3 = 0.047288 | 1. | |
| r4 = 0.786038 | d4 = 0.179694 | 1.80518 | 25.5 |
| r5 = 23.849087 | d5 = 0.041557 | 1. | |
| r6 = 1.218140 | d6 = 0.006756 | 1.72342 | 38.0 |
| r7 = 0.923918 | d7 = 0.160779 | 1. | |

TABLE 1-continued

| | | | |
|---|---|---|---|
| r8 = 22.190507 | *d8 = 0.945759 | 1.80518 | 25.5 |
| r9 = 1.991961 | d9 = 0.05911 | 1. | |
| r10 = −7.437378 | d10 = 0.008181 | 1.6935 | 53.4 |
| r11 = 0.686304 | d11 = 0.075661 | 1. | |
| r12 = 2.085653 | d12 = 0.149156 | 1.744 | 44.9 |
| r13 = −1.560376 | d13 = 0.141864 | 1. | |
| r14 = 0.845674 | d14 = 0.056746 | 1.80518 | 25.5 |
| r15 = −2.832972 | d15 = 0.075661 | 1. | |
| r16 = −0.733727 | d16 = 0.006755 | 1.744 | 44.9 |
| r17 = −8.332682 | d17 = 0.056746 | 1. | |
| r18 = −1.867355 | | 1.6779 | 55.5 |
| | *d8 = 0.945759−0.174965 | | |
| fW = 1 | fT = 1.5045 | fA = 1.920277 | |
| lW = 1.3955 | lT = 1.7140 | | |

FIGS. 2A–2C and 3A–3C show the spherical aberration, sine condition, astigmatism and distortion on the wide angle side (2A–2C) and those on the telephoto side (3A–3C) of the lens system of the preferred embodiment shown in FIG. 1.

EXAMPLE 2

FIG. 4 shows another preferred embodiment of the lens system according to the present invention. The optical data of this lens system are shown in Table 2.

TABLE 2

| R (radius of curvature) | d (distance) | Nd (refractive index) | νd (Abbe number) |
|---|---|---|---|
| r1 = 1.457523 | d1 = 0.054412 | 1. | |
| r2 = 0.673023 | d4 = 0.309465 | 1.80518 | 25.5 |
| r5 = −33.777967 | d5 = 0.047610 | 1. | |
| r6 = 1.096340 | d6 = 0.017003 | 1.77252 | 49.6 |
| r7 = 0.939638 | d7 = 0.161874 | 1. | |
| r8 = 11.51461 | d8 = *0.9522 | 1.80518 | 25.5 |
| r9 = 3.10274 | d9 = 0.062913 | 1. | |
| r10 = −3.020367 | d10 = 0.006802 | 1.69680 | 55.6 |
| r11 = 0.773743 | d11 = 0.076176 | 1. | |
| r12 = 4.482 | d12 = 0.176458 | 1.73400 | 51.3 |
| r13 = −1.555655 | d13 = 0.190440 | 1. | |
| r14 = 0.849853 | d14 = 0.057132 | 1.80518 | |
| r15 = −3.772288 | d15 = 0.076176 | 1. | |
| r16 = −0.749117 | d16 = 0.006802 | 1.77252 | 49.6 |
| r17 = −6.937206 | d17 = 0.076176 | 1. | |
| r18 = −3.101834 | | 1.72342 | 38.0 |
| | *d8 = 0.9522−0.176157 | | |
| fW = 1.0 | fT = 1.54142 | fA = 1.867598 | |
| lW = 1.29152 | lT = 1.63446 | | |

FIGS. 5A–5C and 6A–6C show the spherical aberration, sine condition, astigmatism and distortion on the wide angle, side (5A–5C) and those on the telephoto side (6A–6C) of the lens system of the preferred embodiment shown in FIG. 4.

EXAMPLE 3

FIGS. 7 shows yet another preferred embodiment of the lens system according to the present invention. The optical data of this lens system are shown in Table 3.

TABLE 3

| R (radius of curvature) | d (distance) | Nd (refractive index) | νd (Abbe number) |
|---|---|---|---|
| r1 = 1.388813 | d1 = 0.053774 | 1. | |
| r2 = 0.667942 | d4 = 0.305839 | 1.80518 | 25.5 |
| r5 = −32.080306 | d5 = 0.047052 | 1. | |
| r6 = 1.0746 | d6 = 0.016804 | 1.7859 | 44.0 |
| r7 = 0.926169 | d7 = 0.159977 | 1. | |
| r8 = 11.379693 | *d8 = 0.941044 | 1.80518 | 25.5 |
| r9 = 3.793155 | d9 = 0.062176 | 1. | |
| r10 = −2.792763 | d10 = 0.006722 | 1.72 | 50.3 |
| r11 = 0.734003 | d11 = 0.075284 | 1. | |

TABLE 3-continued

| | | | |
|---|---|---|---|
| r12 = 3.010675 | d12 = 0.1895167 | 1.72 | 50.3 |
| r13 = −1.634778 | d13 = 0.188209 | 1. | |
| r14 = 0.840651 | d14 = 0.047052 | 1.80518 | 25.5 |
| r15 = −55.673176 | d15 = 0.094104 | 1. | |
| r16 = −0.814157 | d16 = 0.006727 | 1.77252 | 49.6 |
| r17 = −10.696839 | d17 = 0.048712 | 1. | |
| r18 = −4.99349 | | 1.72342 | 38.0 |
| | *d8 = 0.941044−0.174093 | | |
| fW = 1.0 | fT = 1.540815 | fA = 1.863930 |
| lW = 1.285346 | lT = 1.625488 | |

FIGS. 8A–8C and 9A–9C show the spherical aberration, sine condition, astigmatism and distortion on the wide angle side (8A–8C) and those on the telephoto side (9A–9C) of the lens system of the preferred embodiment shown in FIG. 7.

EXAMPLE 4

FIG. 10 shows still another preferred embodiment of the lens system according to the present invention. The optical data of this lens system are shown in Table 4.

TABLE 4

| R (radius of curvature) | d (distance) | Nd (refractive index) | νd (Abbe number) |
|---|---|---|---|
| r1 = 1.419097 | d1 = 0.053812 | 1. | |
| r2 = 0.667306 | d4 = 0.306057 | 1.80518 | 25.5 |
| r5 = −21.296539 | d5 = 0.047088 | 1. | |
| r6 = 1.000975 | d6 = 0.016816 | 1.744 | 44.9 |
| r7 = 0.892106 | d7 = 0.164800 | 1. | |
| r8 = 11.400800 | *d8 = 0.9329701 | 1.80518 | 25.5 |
| r9 = 3.956883 | d9 = 0.089799 | 1. | |
| r10 = −2.745535 | d10 = 0.006727 | 1.72 | 50.3 |
| r11 = 0.73595 | d11 = 0.101907 | 1. | |
| r12 = 5.354656 | d12 = 0.132849 | 1.72 | 50.3 |
| r13 = −1.590186 | d13 = 0.235429 | 1. | |
| r14 = 0.822319 | d14 = 0.037669 | 1.80518 | 25.5 |
| r15 = −2.850234 | d15 = 0.07500 | 1. | |
| r16 = −0.723278 | d16 = 0.006727 | 1.77252 | 49.6 |
| r17 = −18.871960 | d17 = 0.047086 | 1. | |
| r18 = −4.339623 | | 1.72342 | 38.0 |
| | *d8 = 0.9329701−0.174217 | | |
| fW = 1.0 | fT = 1.53634 | fA = 1.867352 |
| lW = 1.286045 | lT = 1.620254 | |

FIGS. 11A–11C and 12A–12C show the spherical aberration, sine condition, astigmatism and distortion on the wide angle side (11A–11C) and those on the telephoto side (12A–12C) of the lens system of the preferred embodiment shown in FIG. 10.

By adoption of the lens structure described above and fulfillment of the various requirements touched upon above, there can be provided a very compact zoom lens which, in the case of application to a frame area of 24×36mm$^2$, has a focal length ranging from 29.7mm to 45.6mm and a lens length of 92.7 as measured from the first surface to the focal plane.

What is claimed is:

1. A wide angle zoom lens consisting of a front lens group comprising at least one negative meniscus lens having its convex surface directed toward the object side, a negative lens with a first surface concave towards the image side and a second surface of larger radius of curvature directed toward the object side and a positive meniscus lens having the surface of larger radius of curvature directed toward the image side and a rear lens group comprising one biconvex lens, a first positive meniscus lens having its surface of larger radius of curvature directed toward the image side, one biconcave lens having the surface of larger radius of curvature directed toward the object side and two positive meniscus lenses with the convex side toward the image in the order mentioned from the object side and adapted to provide variation in magnification by causing the two lens groups to be moved in mutually opposite directions along the optical axis of the lens system, which zoom lens is characterized by fulfilling the following requirements in which the focal length (fW) on the wide angle side is assumed to be 1:

(1) $-2.1 < fA < -1.7$
(2) $0.2 < d12 + d13 < 0.45$
(3) $-0.1 < 1/r5 < 0.1$
(4) $0.9 < 1/r7 < 1.3$
(5) $1.2 < 1/r11 < 1.6$
(6) $-0.8 < 1/r13 < -0.5$
(7) $vd4 < 30.0$ wherein, fA stands for the focal length of the front lens group, r5 for the radius of curvature of the object side surface of the said negative lens of the front lens group, r7 for the radius of curvature of the object side surface of the positive meniscus lens of the front lens group, r11 for the radius of curvature of the object side surface of the first positive meniscus lens of the rear lens group, r13 for the radius of curvature of the object side surface of the biconcave lens of the rear lens group, d12 for the length of the air gap between the first positive meniscus lens of the rear lens group and the biconcave lens of the rear lens group, d13 for the center thickness of the biconcave lens of the rear lens group and vd4 for the Abbe number of the positive meniscus lens of the front lens group.

2. A wide angle zoom lens consisting of a front lens group comprising at least one negative meniscus lens having its convex surface directed toward the object side, a negative lens with a first surface concave towards the image side and a second surface of larger radius of curvature directed toward the object side and a positive meniscus lens having the surface of larger radius of curvature directed toward the image side and a rear lens group comprising one biconvex lens, a first positive meniscus lens having its surface of larger radius of curvature directed toward the image side, one biconcave lens having the surface of larger radius of curvature directed toward the object side and two positive meniscus lenses with the convex side toward the image in the order mentioned from the object side and adapted to provide variation in magnification by causing the two lens groups to be moved in mutally opposite directions along the optical axis of the lens system, which zoom lens is characterized by fulfilling the following requirements in which the focal length (fW) on the wide angle side is assumed to be 1:

(1) $-1.95 < fA < -1.85$
(2) $0.25 < d12 + d13 < 0.4$
(3) $-0.03 < 1/r5 < 0.04$
(4) $0.9 < 1/r7 < 1.3$
(5) $1.25 < 1/r11 < 1.4$
(6) $-0.7 < 1/r13 < -0.6$
(7) $vd4 \approx 25.5$ wherein, fA stands for the focal length of the front lens group, r5 for the radius of curvature of the object side surface of the said negative lens of the front lens group, r7 for the radius of curvature of the object side surface of the positive meniscus lens of the front lens group, r11 for the radius of curvature of the object side surface of the first positive meniscus lens of the rear lens group, r13 for the radius of curvature of the object side surface of the biconcave lens of the rear lens group, d12 for the length of the air gap between the first positive meniscus lens of the rear lens group and the biconcave lens of the rear lens group, d13 for the center thickness of the biconcave lens of the rear lens group and vd4 for the Abbe number of the positive meniscus lens of the front lens group.

* * * * *